(12) United States Patent
Flink et al.

(10) Patent No.: US 12,278,405 B2
(45) Date of Patent: Apr. 15, 2025

(54) FUEL CELL STACK AND BIPOLAR PLATE ASSEMBLY

(71) Applicants: POWERCELL SWEDEN AB, Gothenburg (SE); Reinz-Dichtungs-GmbH, Neu-Ulm (DE)

(72) Inventors: Johan Flink, Gothenburg (SE); Bernd Gaugler, Ulm (DE); Claudia Kunz, Ulm (DE)

(73) Assignees: POWERCELL SWEDEN AB, Gothenburg (SE); Reinz-Dichtungs-GmbH, Neu-Ulm (DE)

( * ) Notice: Subject to any disclaimer, the term of this patent is extended or adjusted under 35 U.S.C. 154(b) by 1115 days.

(21) Appl. No.: 16/489,019

(22) PCT Filed: Feb. 23, 2018

(86) PCT No.: PCT/SE2018/050177
§ 371 (c)(1),
(2) Date: Aug. 27, 2019

(87) PCT Pub. No.: WO2018/164624
PCT Pub. Date: Sep. 13, 2018

(65) Prior Publication Data
US 2020/0006791 A1    Jan. 2, 2020

(30) Foreign Application Priority Data
Mar. 7, 2017   (SE) .................................... 1750252-7

(51) Int. Cl.
*H01M 8/0297* (2016.01)
*H01M 8/0267* (2016.01)
(Continued)

(52) U.S. Cl.
CPC ....... *H01M 8/0297* (2013.01); *H01M 8/0267* (2013.01); *H01M 8/1004* (2013.01); *H01M 8/2484* (2016.02)

(58) Field of Classification Search
CPC ............. H01M 8/0297; H01M 8/0267; H01M 8/1004; H01M 8/2484; H01M 8/0271;
(Continued)

(56) References Cited

U.S. PATENT DOCUMENTS 6,974,648 B2 * 12/2005 Goebel ............... H01M 8/0297
429/513
2002/0045087 A1    4/2002 Sugita et al.
(Continued)

FOREIGN PATENT DOCUMENTS

CA        2874053         6/2012
EP        2911228 A1      8/2015
(Continued)

OTHER PUBLICATIONS

Indian Official Action (Dec. 20, 2014) for corresponding Indian App. 201927036010.
(Continued)

*Primary Examiner* — Helen Oi K Conley
(74) *Attorney, Agent, or Firm* — WRB-IP PLLC

(57) ABSTRACT

A bipolar plate assembly for a fuel cell or a fuel cell stack has at least a first flow field plate and a second flow field plate, wherein the first flow field plate and the second flow field plate are fastened on top of each other, wherein the bipolar plate assembly has a first area, in which an edge of the first flow field plate is flush with an edge of the second flow field plate, and has at least one second area, in which the edge of the first flow field plate is recessed from the edge of the second flow field plate. A fuel cell stack having such a bipolar plate assembly, as well as methods for manufac-
(Continued)

turing such a bipolar plate assembly or such a fuel cell stack are also provided.

9 Claims, 4 Drawing Sheets

(51) Int. Cl.
*H01M 8/1004* (2016.01)
*H01M 8/2484* (2016.01)

(58) Field of Classification Search
CPC .. H01M 8/2404; H01M 8/241; H01M 8/0247; H01M 8/0202; H01M 8/10
See application file for complete search history.

(56) References Cited

U.S. PATENT DOCUMENTS

| | | | |
|---|---|---|---|
| 2002/0187384 A1* | 12/2002 | Kato | H01M 8/0258 429/479 |
| 2005/0242471 A1* | 11/2005 | Bhatt | B23K 26/0846 264/494 |
| 2007/0059580 A1 | 3/2007 | Budinski et al. | |
| 2010/0227243 A1 | 9/2010 | Jung et al. | |
| 2011/0195335 A1 | 8/2011 | Goebel et al. | |
| 2012/0107713 A1 | 5/2012 | Miller et al. | |
| 2013/0202983 A1* | 8/2013 | Nishiyama | H01M 8/248 429/465 |

FOREIGN PATENT DOCUMENTS

| | | |
|---|---|---|
| JP | 2004363073 A | 12/2004 |
| JP | 2006156176 A | 6/2006 |
| KR | 20090089728 A | 8/2009 |

OTHER PUBLICATIONS

European Official Action (Oct. 27, 2020) for corresponding European App. 18711421.0.
Korean Official Action (Oct. 12, 2020) for corresponding Korean App. 10-2019-7024289.
Japanese Official Action (Sep. 25, 2020) for corresponding Japanese App. 2019-548399.
Swedish Search Report (Jul. 3, 20203) for corresponding Swedish App. 1750252-7.
Canadian Official Action (May 21, 2025) for corresponding Canadian App. 3051827.
International Search Report (May 4, 2018) for corresponding International App. PCT/SE2018/050177.

* cited by examiner

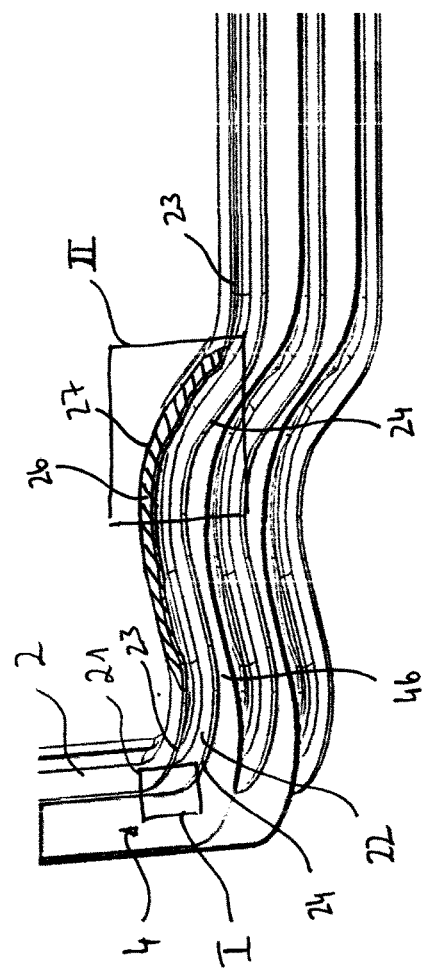
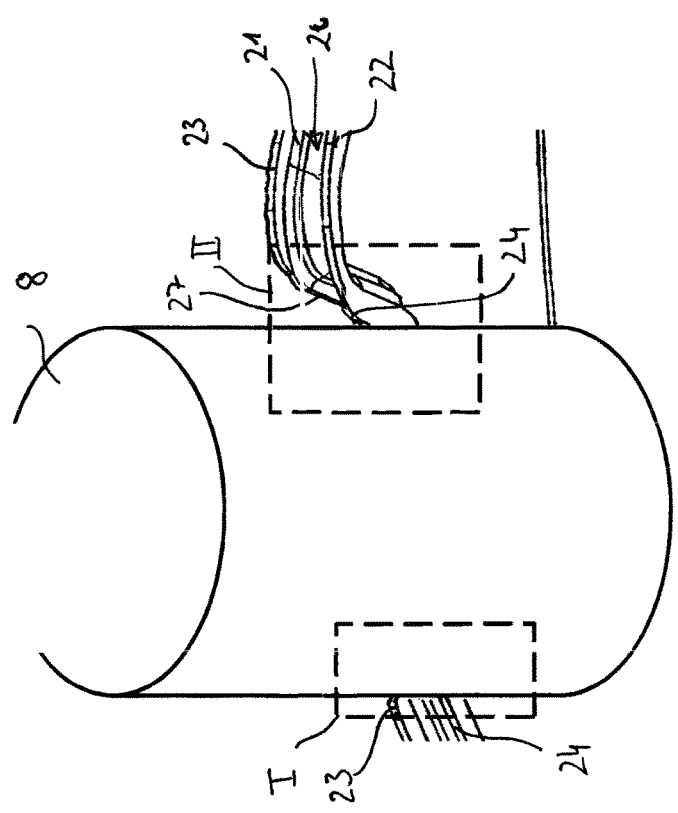

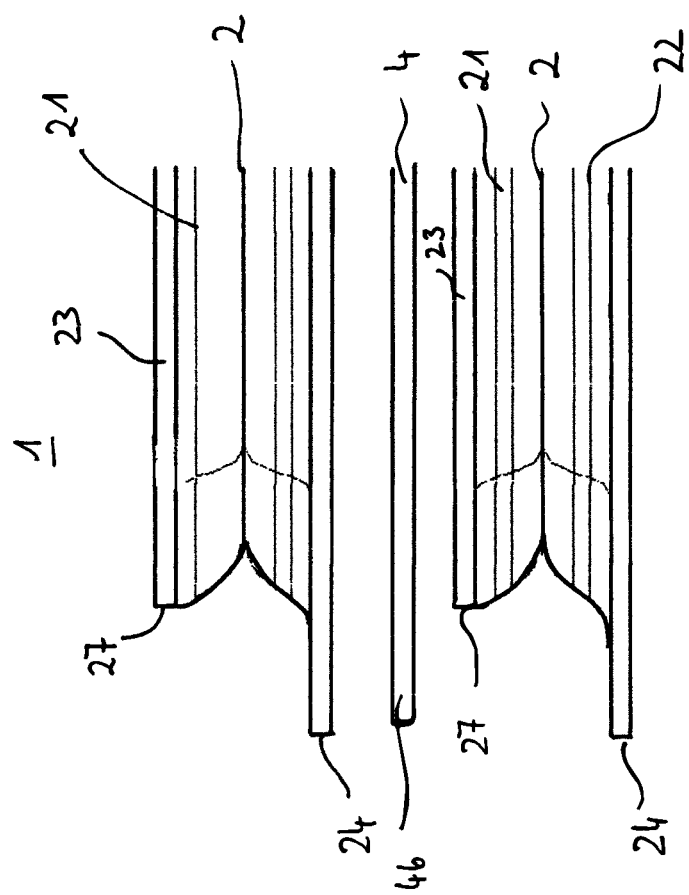

FUEL CELL STACK AND BIPOLAR PLATE ASSEMBLY

BACKGROUND AND SUMMARY

The present invention relates to a bipolar plate assembly for a fuel cell or a fuel cell stack, to a fuel cell stack comprising such a bipolar plate assembly, as well as to a method for manufacturing such a bipolar plate assembly or such a fuel cell stack.

Usually, a fuel cell stack comprises a plurality of membrane electrode assemblies (MEAs), which are separated by so called bipolar plate assemblies. The bipolar plate assemblies themselves usually comprise at least two metal plates, so called flow field plates, which are placed on top of each other and have a flow field for the reactants at one side and a flow field for a cooling fluid on the other side. In the bipolar plate assembly, the cooling fluid flow fields are facing each other, wherein the reactant fluid flow fields are arranged at the outside surfaces of the bipolar plate assembly, which face the MEAs. The electric current produced by the MEAs during operation of the fuel cell stack results in a voltage potential difference between the bipolar plate assemblies. Consequently, the individual bipolar plate assemblies must be kept electrically separated from each other under all circumstances in order to avoid a short circuit.

To solve the electrical separation an insulating layer is provided, the so called subgasket, which is arranged at or surrounds the periphery of the membrane electrode assembly, whereby a membrane-electrode-subgasket assembly is formed. The subgaskets normally extend beyond the edges of the bipolar plate assembly in order to achieve sufficient short circuit protection.

When assembling a fuel cell stack, the bipolar plate assemblies and the MEAs have to be precisely aligned to each other in order to ensure working of the fuel cell stack. For facilitating the alignment, it is known to have, at each bipolar plate assembly and also at the membrane-electrode-subgasket assembly, at least one, preferably two specific areas where the geometry of the bipolar plate/membrane-electrode-subgasket assembly allows for the arrangement of an aligning tool. Such an aligning tool may be a so called guiding rod or a guiding walk which define the outer dimensions of the final fuel cell stack.

For a precise alignment of the elements of the fuel cell stack, it is necessary that in these areas the subgaskets do not extend over the edges of the bipolar plate assemblies. Unfortunately, this also means that in these areas an insufficient electrical separation occurs, so that these areas run a risk of a short circuit, mainly due to bent bipolar plates and/or inadequate assembly.

Consequently it is desirable to provide a bipolar plate assembly having an adjusted geometry so that the electrical hazards are eliminated.

As explained above, a fuel cell stack usually comprises a plurality of bipolar plate assemblies and a plurality of membrane-electrode-subgasket assemblies, which are alternately arranged so that each membrane-electrode-subgasket assembly is sandwiched between two adjacent bipolar plate assemblies. The membrane-elect rode-subgasket assembly itself comprises a proton exchange membrane, which is sandwiched between two electrodes, and a subgasket, which at least surrounds a periphery of the membrane-electrode assembly and is arranged to electrically isolate the bipolar plate assemblies, which sandwich the membrane-electrodes-subgasket assembly.

The bipolar plate assembly for such a fuel cell or such a fuel cell stack has at least a first flow field plate and a second flow field plate, wherein the first flow field plate and the second flow filed plate are fastened on top of each other.

For avoiding electrical hazards and protecting the bipolar plate assembly from short circuits, it is suggested that the bipolar plate assembly has a first area, in which an edge of the first flow field plate is flush with an edge of the second flow field, and has at least one second area, in which the edge of the first field plate is recessed from the edge of the second flow field plate.

This amended geometry of the bipolar plate assembly, namely the recessed edge of the first flow field plate, allows that, even in areas where the subgasket of the fuel cell stack comprising such a bipolar plate assembly is insufficiently arranged, i.e. is not extending over the edges of the bipolar plate assemblies, a risk of a short circuit between the bipolar plate assemblies is avoided.

Preferably, the recessed edge is formed in less than 10% of the total periphery of the flow field plate.

According to a preferred embodiment, the recessed edge is formed in a region of the bipolar plate assembly, in which an aligning structure for correctly aligning at least the first flow field plate and the second flow field plate, preferably a guiding rod or a guiding wall, is accommodateable. In this region, it is usually necessary that the subgasket is flush with the edges of the bipolar plate for providing a precise alignment result, which increases the risk of a short circuit. By providing the recessed edge of the first flow field plate in this area, the risk of a contact between adjacent bipolar plate assemblies is reduced.

For accommodating the aligning structure it may be preferred if the second area, where the recessed edge is present, is formed as a pocket. Advantageously, such a pocket may accommodate the aligning structure, i.e. a guiding rod or a guiding wall, easily and the fuel cell may be positioned more precisely at the aligning structure. Thereby, the accuracy of the alignment of the fuel cell elements may be increased.

It should be noted that when using a guiding wall as aligning structure such a pocket would not be necessary, but can still be present.

For further increasing the accuracy of the alignment, the bipolar plate assembly or the fuel cell stack respectively, do not only have a single recessed edge area, but at least two second areas, with recessed edges. Thereby, the at least two second areas are preferably arranged opposite to each other, preferably diagonally opposite to each other.

A further aspect of the present invention relates to a fuel cell stack comprising at least a first bipolar plate assembly, at least a second bipolar plate assembly, and at least one membrane-electrode-subgasket assembly, which is sandwiched between the first and second bipolar plate assemblies. The membrane-electrode-subgasket assembly comprises a proton exchange membrane, which is sandwiched between two electrodes, and a sub-gasket, which at least surrounds a periphery of the membrane-electrode assembly and is arranged to electrically isolate the first and the second bipolar plate assembly. Thereby it is preferred if at least one of the bipolar plate assemblies is a bipolar plate assembly as described above.

According to a further preferred embodiment the subgasket of the membrane-electrode-subgasket assembly extends beyond the edge of the bipolar plate assemblies in the first area, in which the edges of the flow field plates of the bipolar plate assemblies are flush, and is flush with the edges of the second flow field plates of the bipolar plate assemblies in the second area, in which the edges of the first flow field plates are recessed from the edges of the second flow field plates of the bipolar plate assemblies. This arrangement ensures an optimal electric isolation between adjacent bipolar plates assemblies throughout the fuel cell stack and provide a precise alignment possibility for the fuel cell stack elements. If the subgasket would not be flush with the other elements of the fuel cell stack in the second area, the alignment of the elements of the fuel cell stack might vary within the tolerance that the protrusion of the subgasket over the edge of the bipolar plate assembly would provide.

According to a further preferred embodiment the membrane-electrode-subgasket assembly farther comprises two gas diffusion layers, which sandwich the proton exchange membrane, the electrodes and the sub-gasket, and wherein the sub-gasket extends beyond the gas diffusion layers. This arrangement also ensures that the elements of the fuel cell stack are sufficiently electrically isolated from each other.

According to a further preferred embodiment, the second area is formed as pocket on each membrane-electrode-subgasket assembly as well as on each bipolar plate assembly. Thereby it is preferred if not only a single pocket is present, but at least two pockets are provided which are preferably arranged opposite each other.

This arrangement allows for use of a guiding rod or a guiding wall having defined positions at the fuel cell stack so that a correct and precise alignment may be ensured.

A further aspect of the present invention relates to a method for manufacturing the above-described bipolar plate assembly or the above-described fuel cell stack.

For manufacturing a bipolar plate assembly as described above, usually a first flow field plate and a second flow field plate are fastened on top of each other. Thereby is preferred to manufacture the first flow field plate assembly in such a way that the final bipolar plate assembly has a first area, in which an edge of the first flow field plate is flush with an edge of the second flow field, and has at least one second area, in which the edge of the first field plate is recessed from the edge of the second flow field plate.

The manufacture of the second area having a recessed edge may be performed before or after the first and the second flow field plate have been fastened together by cutting away a peripheral portion of the first flow field plate after the first flow field plate has been formed by molding or stamping. This has the advantage that both flow field plates may be identically designed and only one plate is post-treated for providing the second area with the recessed edge.

Alternatively, the second area having a recessed edge may be manufactured during the molding or stamping process of the first flow field plate so that a post-treatment of the flow field plate may be avoided.

For manufacturing the fuel cell stack, the method comprises the steps of providing at least one membrane-electrode-subgasket assembly, providing at least a first and second bipolar plate assembly as described above, which already has at least one second area with the recessed edge and sandwiching the membrane-electrode-subgasket assembly between the first bipolar plate assembly and the second bipolar plate assembly.

For correctly aligning the elements of the fuel cell stack, the fuel cell stack elements may be aligned by means of an aligning structure, such as a guiding rod or a guiding wall. Thereby it is preferred if the second area is formed as pocket so that accommodating the aligning structure is facilitated.

Alternatively, it is also possible to assemble the fuel cell stack, first, and after having assembled the fuel cell stack cutting away the peripheral portions of the first flow field plates.

For manufacturing the fuel cell stack as such, the method may further comprise at least one of the steps of: manufacturing at least one membrane-electrode-subgasket assembly by sandwiching a proton exchange membrane between two electrodes, and surrounding a periphery of the resulting membrane-electrode assembly with a subgasket, which is adapted to electrically isolate the first and second bipolar plate assembly; manufacturing at least a first and a second bipolar plate assembly, wherein for each bipolar plate assembly a first flow field plate and a second flow field plate are fastened on top of each other; sandwiching the membrane-electrode-subgasket assembly between the first bipolar plate assembly and the second bipolar plates assembly, in such a way that the sub-gasket extends beyond the periphery of the bipolar plate assemblies in at least a first area; and alternatingly arranging the bipolar plate assemblies and the membrane-electrode-subgasket assemblies at aligning structures, wherein the aligning structures are accommodated in pockets provided at the bipolar plate assemblies and at the membrane-electrode-subgasket assemblies.

Elements described or shown in combination with other elements may in embodiments disclosed herein may be present alone or in combination with other elements without departing from the scope of protection. In the following, preferred embodiments of the invention are described in relation with the drawings, wherein the drawings are exemplarily only, and are not intended to limit the scope of protection. The scope of protection is defined by the accompanied claims, only.

BRIEF DESCRIPTION OF THE DRAWINGS

The figures show:
FIG. 4: a perspective view of a part of a fuel cell stack;
and
FIG. 5: a cross sectional view through the bipolar plate assembly in a second area II;
FIG. 6: a detailed view of the fuel cell stack shown in FIG. 1.

In the following same or similar functioning elements are indicated with the same reference signs.

DETAILED DESCRIPTION

Figure 1:
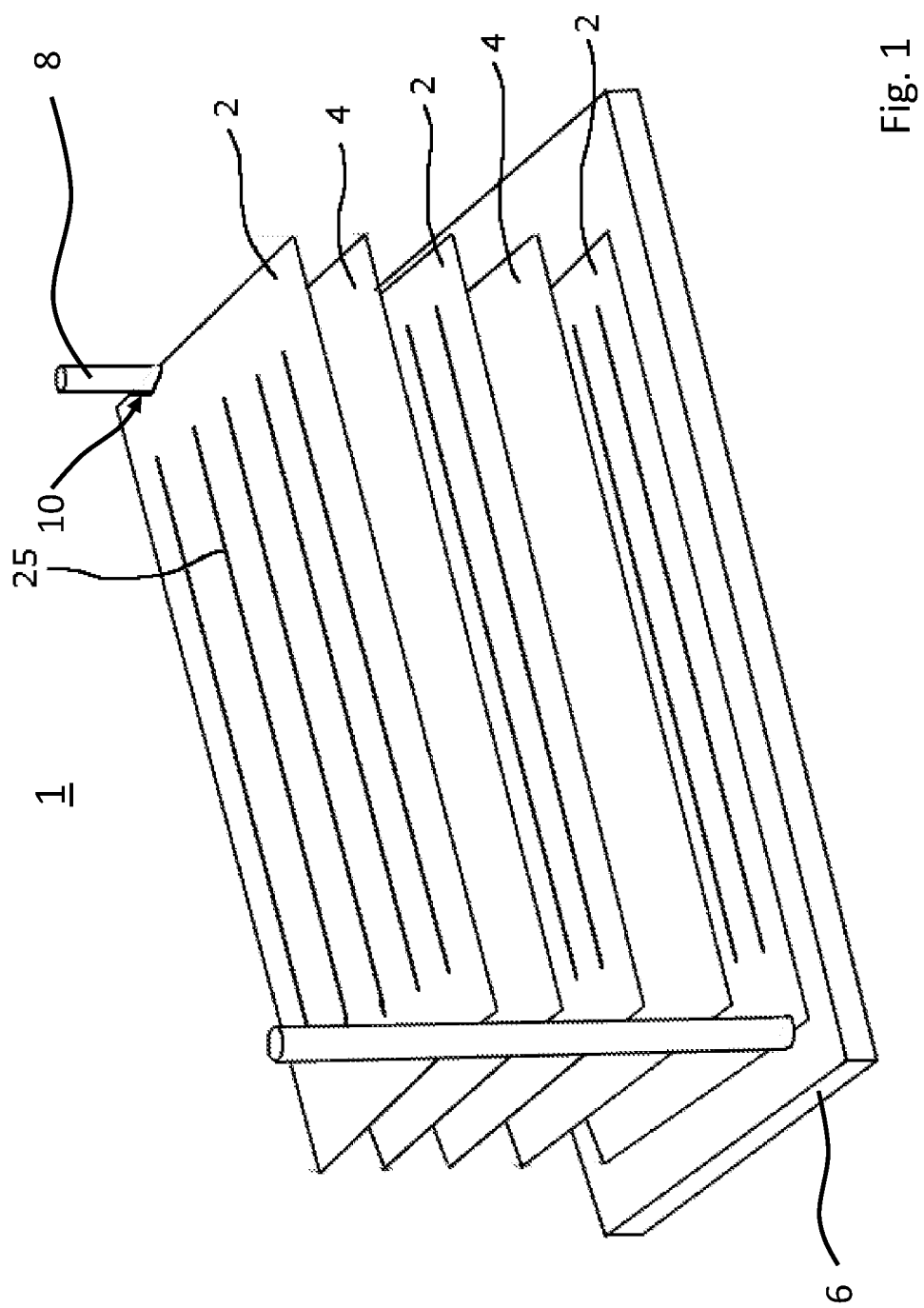
FIG. 1: a perspective view of a fuel cell stack during aligning of the elements.
Figure 2:
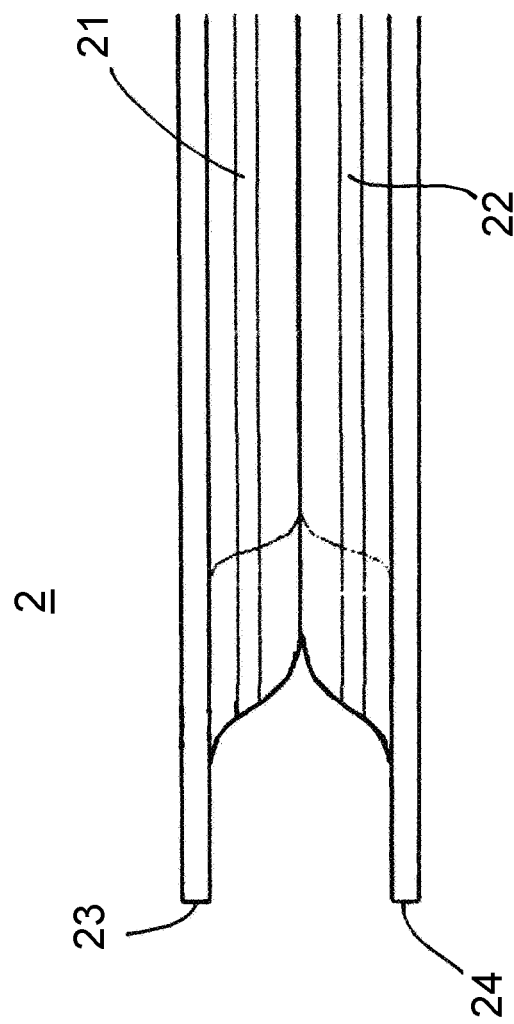
FIG. 2: a cross-sectional view through a part of a bipolar plate assembly in a first area I.

FIG. 1 shows a schematically view of a fuel cell stack 1 during its assembling process. The fuel cell stack 1 has a plurality of bipolar plate assemblies 2 which sandwich membrane-electrode-subgasket assemblies 4 between them.

As shown in the cross-sectional view of FIG. 1 through the bipolar plates assembly 2 in a first area I, the bipolar plate assemblies 2 usually comprise at least a first flow field plate 21 and a second flow field plate 22, which are fastened on top of each other, e.g. by soldering or welding. Each flow field plate has an edge 23, 24, which are, in the first area I, flush to each other and define the outer contour of the respective flow field plate 21, 22. On the outside surface, the resulting bipolar plate assembly 2 has a channel like flow field structure 25 for guiding reactants to the membrane-electrode-subgasket assemblies 4 (see FIG. 1).

Figure 3:
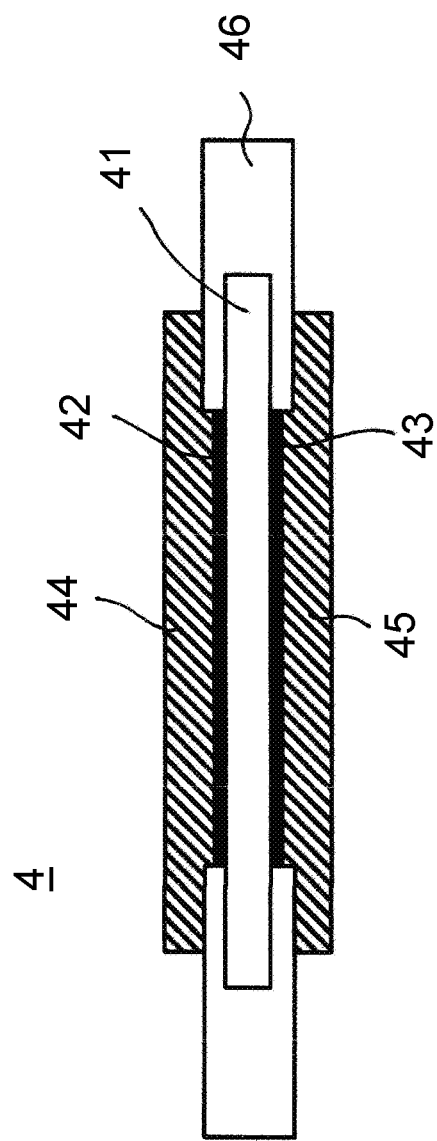
FIG. 3: a cross-sectional view through a membrane-electrode-subgasket assembly.

A schematic cross sectional view of one of the membrane-electrode-subgasket assemblies 4 is shown in FIG. 3. As can be seen from FIG. 3, the membrane-electrode-subgasket assembly 4 usually has a proton exchange membrane 41, which is sandwiched between two electrodes 42, 43. The resulting membrane electrode assembly (MEA) in turn is sandwiched between two gas diffusion layers 44 and 45 which provide a distribution of the reactants to the electrodes 42, 43. For electrically insulating the MEA, the MEA is surrounded by a subgasket 46, which defines the outer periphery of the membrane-electrode-subgasket assembly 4. This subgasket 46 also ensures the electrical insulation between the two adjacent bipolar plate assemblies and usually extends beyond the edges 23, 24 of the bipolar plate assemblies 2. The electrically insulation the fuel cell stack it is necessary, as during operation of the fuel cell stack a voltage potential difference occurs between the bipolar plate assemblies 2.

FIG. 4 shows a perspective view of part of the fuel cell stack 1. As can be seen from FIG. 4, the bipolar plate assemblies 2 sandwich the membrane-electrode-subgasket assemblies 4, wherein the subgasket 46 of the membrane-electrode-subgasket assembly 4 extends beyond the edges 23, 24, of the bipolar plate assemblies 2. As can be further seen from FIG. 4, the edges 23, 24 of the flow field plates 21, 22 of the bipolar plates assembly 2 are flush to each other in a first area I, wherein in a second area II, a peripheral portion 26 is removed from the material of the first flow field plate 21 of the bipolar plate assembly 2, so that the edge 23 of the first flow field plate 21 is recessed from the edge 24 of the second flow field plate 22. The recessed edge is indicated by reference 27.

This recessed edge 27 may be manufactured after assembling the fuel cell stack as indicated in FIG. 4, but is also possible to remove the material 26 after the bipolar plate assembly 2 has been assembled or even before the flow field plates 21, 22 are fastened on top of each other. Besides cutting away material from the flow field plate 21 after its manufacture it is also possible to prepare the recessed edge 27 during manufacture of the flow field plate itself, e.g. during molding or stamping of the flow field plate 21. A post-treatment of the flow field plate may then be avoided.

The recessed edge 27 is also shown in the cross section of FIG. 5 through the second area II of the bipolar plate assembly 2. As can be seen, the first flow field plate 21 of the bipolar plate assembly 2 has the recessed edge 27, wherein the second flow field plate 22 does not have a recessed edge 27. Between the two bipolar plate assemblies 2 the membrane-electrode-subgasket assembly 4 is arranged. In the illustrated cross section through area II, the membrane-electrode-subgasket assembly 4 does not extend beyond the edge 23 of the bipolar plate assembly 2, so that without the recessed edge 27 a contact between the bipolar plate assemblies 2 might occur, if one of the bipolar plate assemblies 2 is for example bent. However, due to the recessed edge 27 of the first flow field plate 21, a contact between bipolar plate assemblies 2 may be avoided, even if the membrane-electrode-subgasket assembly 4 is not sufficiently extending beyond the edges 23, 24 of the bipolar plate assemblies.

Such an insufficient electrical contact usually occurs in regions where a protrusion of the subgasket beyond the bipolar plate should be avoided. The protrusion of the subgasket should be avoided in regions, where an aligning tool-aligning structure for helping to provide a precise alignment of the fuel cell stack elements is arranged. In this area it is necessary that the fuel cell elements are flush to each other for ensuring a precise alignment of all elements.

This can be seen from FIG. 1 and the detailed view of FIG. 6. FIG. 1 illustrates the assembling process of the fuel cell stack 1, wherein the parts of the fuel cell stack 1, namely the bipolar plate assemblies 2 and the membrane-electrode-subgasket assemblies 4 are placed on a ground plate 6 and are aligned by means of at least one, preferably two aligning structures, which are exemplified as two guiding rods 8 in FIG. 1. Instead of the guiding rods 8 also guiding walls may be used which extend along the sides of the fuel cell stack 1.

For providing a precise alignment of the fuel cell elements, the guiding rods 8 are accommodated in pockets 10 which are provided at the bipolar plate assemblies 2 and at the membrane-electrode-subgasket assemblies 4. Consequently, in these regions a protrusion of the subgasket 46 beyond the edges 23, 24 of the bipolar plate assemblies 2 would be counterproductive as then the alignment of the fuel cell elements would only be possible within the tolerances of the protrusion.

The aligning of the fuel cell stack 1 is further illustrated in the detailed view of FIG. 6, which indicates the two areas I and II. In the first area I, the edges 23, 24 of the flow field plates 21, 22 are flush to each other, wherein in the second area II, the edge 27 of the first flow field plate is recessed from the edge 24 of the second flow field plate 22. It is further illustrated that in the first area I the bipolar plate assembly 2 contacts the guiding rod 8 with both edges 23, 24, wherein in the second area II, only the edge 24 of the second flow filed plate contacts the guiding rod 8.

Consequently, due to the new design, namely the recessed edge of one of the flow field plates of the bipolar plate assembly, the electrical insulation between adjacent bipolar plate assemblies 2 is ensured even in regions where the membrane-electrode-subgasket assembly 4 is flush with the bipolar plate assemblies 2.

REFERENCE SIGNS 1 fuel cell stack
2 bipolar plate assembly
21, 22 flow field plates
23, 24 edge of the flow field plate
25 flow field
26 peripheral portion of the flow field plate
27 recessed edge
4 membrane-electrode-subgasket assembly
41 proton conducting membrane
42, 43 electrodes
44, 45 gas diffusion layer
46 subgasket
6 ground plate
8 guiding rod
10 pocket
I first area
II second area

The invention claimed is:
1. Bipolar plate assembly for a fuel cell or a fuel cell stack having at least a first flow field plate and a second flow field plate,
  each of the first flow field plate and the second flow field plate comprising first and second sides parallel to a main plane of the bipolar plate assembly and separated by a peripheral edge extending from the first side to the second side, the peripheral edge of the first flow field plate and the peripheral edge of the second flow field plate being perpendicular to the main plane, wherein one of the first and second sides of the first flow field plate and one of the first and second sides of the second flow field plate face each other and are fastened to each other, and both the first flow field plate and the second flow field plate have a reactant flow field at one side and a cooling fluid flow field on another side, wherein, in the bipolar plate assembly, the cooling fluid flow field of the first flow field plate and the cooling fluid flow field of the second flow field plate face each other, and the reactant flow field of the first flow field plate and the reactant flow field of the second flow field plate are arranged at outside surfaces of the bipolar plate assembly, wherein the bipolar plate assembly comprises a first area and a second area, the first area comprises the peripheral edge of the first flow field plate being flush with the peripheral edge of the second flow field plate, the second area comprises the peripheral edge of the first flow field plate being recessed from the peripheral edge of the second flow field plate, and the second area further comprises the peripheral edge of the first flow field plate and the peripheral edge of the second flow field plate both being recessed relative to the peripheral edge of the first flow field plate and the peripheral edge of the second flow field plate in the first area, when viewed into the main plane.

2. Bipolar plate assembly according to claim 1, wherein the at least one second area is provided in less than 10% of a total periphery of the flow field plate.

3. Bipolar plate assembly according to claim 1, wherein the at least one second area is provided in a region of the bipolar plate assembly in which an aligning structure for correctly aligning at least the first flow field plate and the second flow field plate is adapted to be accommodated.

4. Fuel cell stack comprising at least a first bipolar plate assembly, at least a second bipolar plate assembly, and at least one membrane-electrode-subgasket assembly, which is sandwiched between the first and second bipolar plate assemblies, wherein the membrane-electrode-subgasket assembly comprises a proton exchange membrane, which is sandwiched between two electrodes, and a sub-gasket, which at least surrounds a periphery of the membrane-electrode assembly (MEA) and is arranged to electrically isolate the first and the second bipolar plate assembly, wherein at least one bipolar plate assembly has at least a first flow field plate and a second flow field plate, each of the first flow field plate and the second flow field plate comprising first and second sides parallel to a main plane of the bipolar plate assembly and separated by a peripheral edge extending from the first side to the second side, the peripheral edge of the first flow field plate and the peripheral edge of the second flow field plate being perpendicular to the main plane, wherein one of the first and second sides of the first flow field plate and one of the first and second sides of the second flow field plate face each other and are fastened to each other, wherein the at least one bipolar plate assembly has a first area and a second area, the first area comprises the peripheral edge of the first flow field plate being flush with the peripheral edge of the second flow field plate, the second area comprises the peripheral edge of the first flow field plate being recessed from the peripheral edge of the second flow field plate, and the second area further comprises the peripheral edge of the first flow field plate and the peripheral edge of the second flow field plate both being recessed relative to the peripheral edge of the first flow field plate and the peripheral edge of the second flow field plate in the first area, when viewed into the main plane.

5. Fuel cell stack according to claim 4, wherein a sub-gasket of the membrane-electrode-subgasket assembly extends beyond an edge of the bipolar plate assemblies in the first area and is flush with peripheral edges of the second flow field plates of the bipolar plate assemblies in the second area.

6. Method for manufacturing a bipolar plate assembly, comprising fastening a first flow field plate and a second flow field plate to each other, each of the first flow field plate and the second flow field plate comprising first and second sides parallel to a main plane of the bipolar plate assembly and separated by a peripheral edge extending from the first side to the second side, the peripheral edge of the first flow field plate and the peripheral edge of the second flow field plate being perpendicular to the main plane, so that one of the first and second sides of the first flow field plate and one of the first and second sides of the second flow field plate face each other, and wherein, upon fastening the first flow field plate to the second flow field plate to form a fastened first flow field plate and second flow field plate assembly, the fastened first flow field plate and second flow field plate assembly comprises a first area and a second area, the first area comprises the peripheral edge of the first flow field plate being flush with the peripheral edge of the second flow field plate, the second area comprises the peripheral edge of the first flow field plate being recessed from the peripheral edge of the second flow field plate, and the second area further comprises the peripheral edge of the first flow field plate and the peripheral edge of the second flow field plate both being recessed relative to the peripheral edge of the first flow field plate and the peripheral edge of the second flow field plate in the first area, when viewed into the main plane.

7. Method according to claim 6, wherein a recessed portion of the peripheral edge of the first flow field plate is manufactured by cutting away a peripheral portion of the first flow field plate after the first flow field plate has been formed by molding or stamping.

8. Method according to claim 6, wherein a recessed portion of the peripheral edge of the first flow field plate is manufactured during the molding or stamping process.

9. Method for manufacturing a fuel cell stack, comprising at least one membrane-electrode-subgasket assembly and at least a first bipolar plate assembly and a second bipolar plates assembly, wherein at least one of the bipolar plate assemblies is a bipolar plate assembly that has at least a first flow field plate and a second flow field plate, each of the first flow field plate and the second flow field plate comprising first and second sides parallel to a main plane of the bipolar plate assembly and separated by a peripheral edge extending from the first side to the second side, the peripheral edge of the first flow field plate and the peripheral edge of the second flow field plate being perpendicular to the main plane, the method comprising sandwiching the at least one membrane-electrode-subgasket assembly between the at least first and second bipolar plate assemblies, wherein the membrane-electrode-subgasket assembly comprises a proton exchange membrane, which is sandwiched between two electrodes, and a sub-gasket, which at least surrounds a periphery of the membrane-electrode assembly (MEA) and is arranged to electrically isolate the first and the second bipolar plate assembly manufacturing at least one of the bipolar plate assemblies by fastening one of the first and second sides of the first flow field plate to one of the first and second sides of the second flow field plate so that they face each other and such that the at least one of the bipolar plate assemblies comprises a first area and a second area, the first area comprises the peripheral edge of the first flow field plate being flush with the peripheral edge of the second flow field plate, the second area comprises the peripheral edge of the first flow field plate being recessed from the peripheral edge of the second flow field plate, and the second area further comprises the peripheral edge of the first flow field plate and the peripheral edge of the second flow field plate both being recessed relative to the peripheral edge of the first flow field plate and the peripheral edge of the second flow field plate in the first area, when viewed into the main plane.

* * * * *